United States Patent
Li et al.

(10) Patent No.: US 10,476,261 B2
(45) Date of Patent: Nov. 12, 2019

(54) METHOD AND SYSTEM FOR FAULT POSITIONING AND RECOVERY OF VOLTAGE SOURCE CONVERTER

(71) Applicants: NR ELECTRIC CO., LTD, Jiangsu (CN); NR ENGINEERING CO., LTD, Jiangsu (CN)

(72) Inventors: Gang Li, Jiangsu (CN); Yu Lu, Jiangsu (CN); Zhaoqing Hu, Jiangsu (CN); Jie Tian, Jiangsu (CN); Yunlong Dong, Jiangsu (CN); Tiangui Jiang, Jiangsu (CN); Haiying Li, Jiangsu (CN); Yadong Feng, Jiangsu (CN); Ke Wang, Jiangsu (CN); Jiang Lu, Jiangsu (CN); Shunke Sui, Jiangsu (CN); Hui Wang, Jiangsu (CN); Nannan Wang, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/098,878

(22) PCT Filed: Apr. 25, 2017

(86) PCT No.: PCT/CN2017/081890
§ 371 (c)(1),
(2) Date: Nov. 5, 2018

(87) PCT Pub. No.: WO2017/190608
PCT Pub. Date: Nov. 9, 2017

(65) Prior Publication Data
US 2019/0140441 A1    May 9, 2019

(30) Foreign Application Priority Data

May 5, 2016 (CN) .......................... 2016 1 0294949

(51) Int. Cl.
H02H 7/26 (2006.01)
H02H 3/06 (2006.01)
H02J 3/36 (2006.01)

(52) U.S. Cl.
CPC .............. H02H 7/262 (2013.01); H02H 3/06 (2013.01); H02H 7/26 (2013.01); H02J 3/36 (2013.01); Y02E 60/60 (2013.01)

(58) Field of Classification Search
CPC ................................. H02H 7/262; H02H 3/06
See application file for complete search history.

(56) References Cited

U.S. PATENT DOCUMENTS

| 7,884,588 B2 * | 2/2011 | Adragna | H02M 3/1584 323/272 |
| 2016/0126827 A1 * | 5/2016 | Dong | H02M 1/32 363/50 |

(Continued)

FOREIGN PATENT DOCUMENTS

| CN | 103050966 | 4/2013 |
| CN | 104242250 | 12/2014 |

(Continued)

OTHER PUBLICATIONS

Song et al., "Dual Current Control Scheme for PWM Converter Under Unbalanced Input Voltage Conditions" IEEE Transactions on Industrial Electronics, Oct. 1999, pp. 953-959.

(Continued)

*Primary Examiner* — Scott Bauer
(74) *Attorney, Agent, or Firm* — JCIPRNET (57) ABSTRACT

A method for fault positioning and recovery of a voltage source converter includes following steps. Locking a converter station when it is detected that an alternating-current voltage contains a zero sequence voltage or a direct-current voltage contains an unbalanced voltage. Positioning a fault by continuing to detect the zero sequence voltage of an (Continued)

alternating-current side of the converter. Recovering operation of each station after the fault is positioned. The method for fault positioning and recovery is simple, practical, has high reliability, and can effectively detect the problems that each station contains a zero sequence voltage of an alternating-current side and cannot easily position a fault caused due to transmission of the zero sequence voltage of the alternating-current side to an opposite-side alternating-current system via a voltage source converter.

46 Claims, 2 Drawing Sheets

(56) References Cited

U.S. PATENT DOCUMENTS

2016/0172993 A1\* 6/2016 Yuasa .................. H02M 5/458
318/504

2016/0380551 A1\* 12/2016 Hoerger .................. H02M 1/12
363/65

FOREIGN PATENT DOCUMENTS

| CN | 104578009 | 4/2015 |
| CN | 105896586 | 8/2016 |
| WO | 2004/017505 | 2/2004 |

OTHER PUBLICATIONS

Hairong Chen, "Control and Protection of VSC Based HVDC System Under AC System Fault Conditions", A Thesis submitted for the degree of Doctor of Philosophy, College of Electrical Engineering, Zhejiang University, Jan. 2007, pp. 1-187.

"International Search Report (Form PCT/ISA/210)", dated Jul. 12, 2017, with English translation thereof, pp. 1-4.

\* cited by examiner

METHOD AND SYSTEM FOR FAULT POSITIONING AND RECOVERY OF VOLTAGE SOURCE CONVERTER

CROSS-REFERENCE TO RELATED APPLICATION

This is a 371 application of the International PCT application serial no. PCT/CN2017/081890, filed on Apr. 25, 2017, which claims the priority benefits of China Application No. 201610294949.6, filed on May 5, 2016. The entirety of each of the above-mentioned patent applications is hereby incorporated by reference herein and made a part of this specification.

BACKGROUND OF THE INVENTION

Technical Field

The present invention relates to a field of direct-current power transmission, and in particular, to a method and system for fault positioning and recovery of a voltage source converter.

Background Art

A flexible alternating-current and direct-current power transmission technology employs a voltage source converter, which can regulate active power and reactive power separately, hence achieving flexible and convenient control. A receiving-end system can be a passive network, and it is unnecessary to apply an external commutating voltage. An alternating-current side does not need to provide reactive power and a reactive compensation function can be achieved, thereby dynamically compensating reactive power of an alternating-current bus and stabilizing an alternating-current voltage. Therefore, the voltage source converter is one of developing trends of electric power system transmission.

The development of the voltage source converter based on a modular multilevel converter (MMC) technology solves a voltage balancing issue and a problem of great loss of a two-level-based technology, and also reduces harmonic waves of an alternating-current system, thus making it possible to connect the voltage source converter to an alternating-current power grid in a transformerless manner, thereby reducing the overall investment, occupied space and power loss of converter stations.

Figure 1:
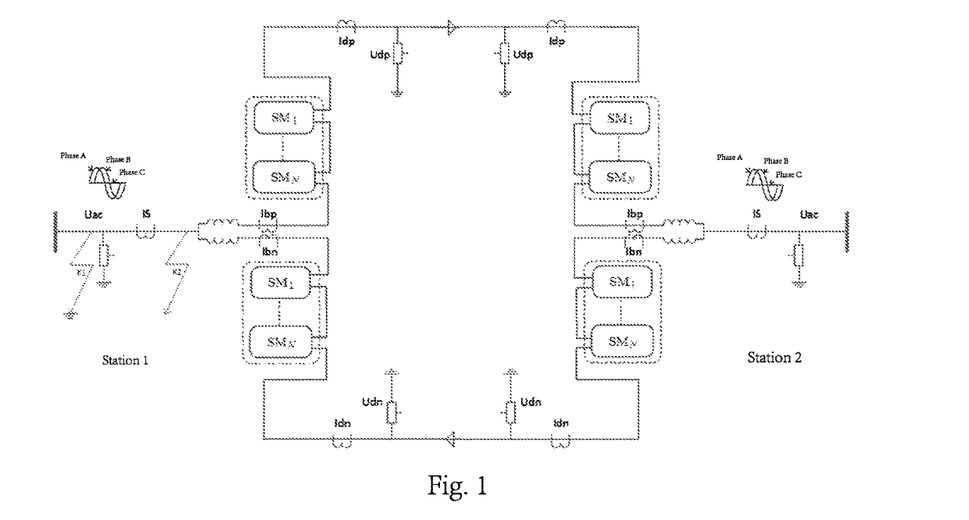
FIG. 1 is a schematic diagram of voltages of a faulty station and a non-faulty station, illustrating that when the faulty station sends point k1 and point k2 single-phase grounding faults in the case where converters at two terminals are connected in a transformerless direct-current manner.
Figure 2:
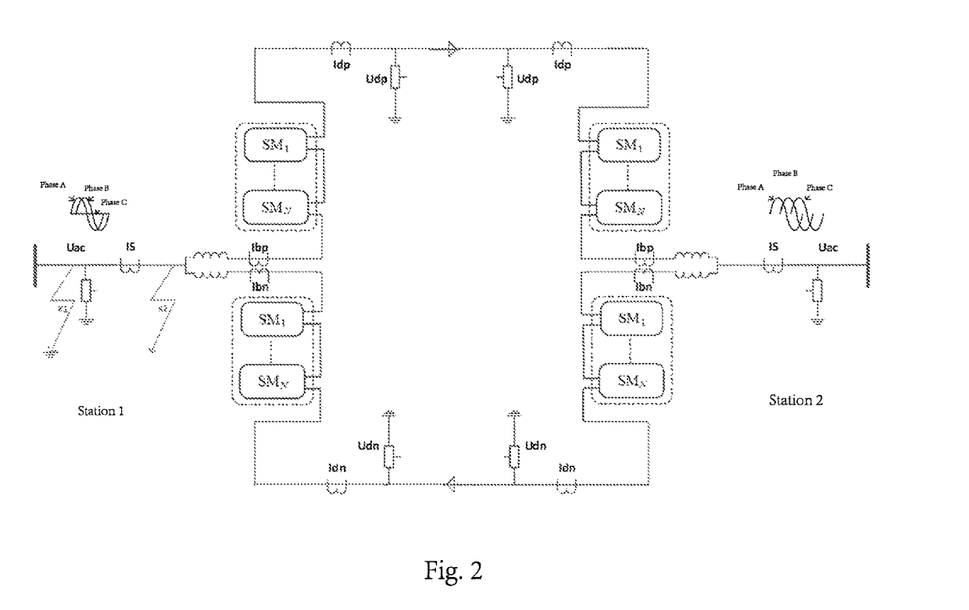
FIG. 2 is a schematic diagram of voltages of a faulty station and a non-faulty station, illustrating that after the faulty station sends k1 and k2 faults and then is locked or put into control of a zero sequence voltage in the case where converters at two terminals are connected in a transformerless direct-current manner.
Figure 3:
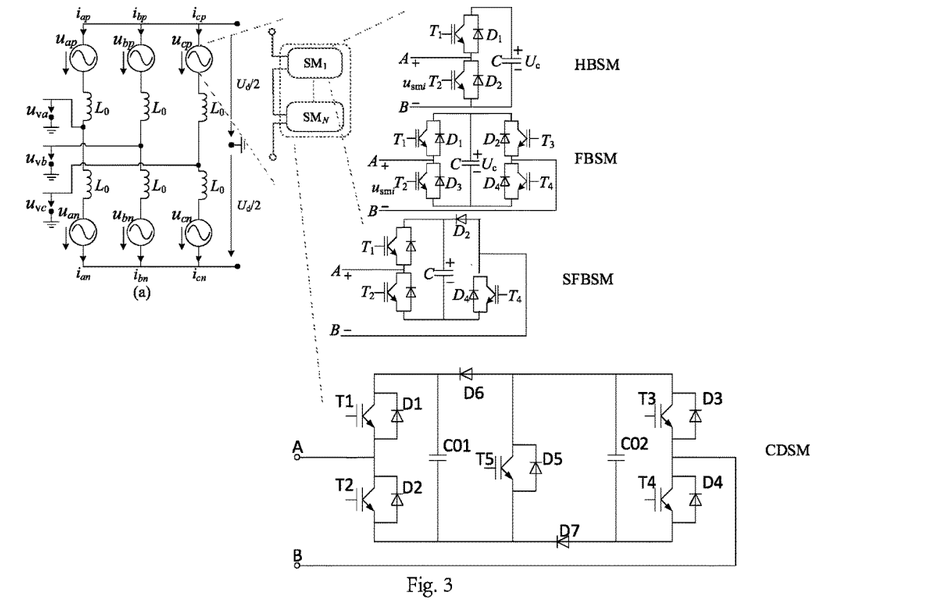
FIG. 3 shows a topology of the converter in the present invention, where a bridge arm module can be a half-bridge sub-module (HBSM), a full-bridge sub-module (FBSM) or a similar full-bridge sub-module (SFBSM)

When the voltage source converter is connected to an alternating-current power grid in a transformerless manner as shown in FIG. 1, when an asymmetric fault occurs in the alternating-current system, the converter cannot isolate an unbalanced voltage which is generated by the alternating-current system and contains a zero sequence voltage. As shown in FIG. 2, MMC-type voltage source converters such as the half bridge, full bridge, and similar full bridge all have similar fault response characteristics. For example, when a single-phase earth fault occurs in an ungrounded system, a high-resistance grounded system, or a system that is grounded through an arc suppression coil, a zero sequence voltage will appear in the voltage of the alternating-current power grid and cause alternating-current voltages of various stations to be unbalanced. When single-phase metal grounding occurs in a faulty station, a non-faulty phase voltage rises from a phase voltage to a line voltage (which is $\sqrt{3}$ times the phase voltage). The zero sequence voltage of the alternating-current side enters a direct-current side through the converter and causes fluctuation of a direct-current voltage. The voltage fluctuation is transmitted to other converter stations through a direct-current cable or an overhead line, and finally causes alternating-current voltages of non-faulty stations to be unbalanced as well, thus affecting normal operation of alternating-current systems of the non-faulty stations.

In a connection manner with the presence of a transformer, the zero sequence voltage can be isolated at the alternating-current side by the transformer, and will not be transmitted to the alternating-current side of other converter stations through the direct-current side. Therefore, current control and detection method is to control a negative sequence voltage in an unbalanced voltage, while a zero sequence voltage in the unbalanced voltage is not detected or controlled. Moreover, for the unbalanced voltage containing a zero sequence voltage, how to accurately position the fault is a difficult problem because same zero sequence voltage is detected when the fault occurs. In "Dual current control scheme for PWM converter under unbalance input voltage conditions" (IEEE Transactions on Industrial Electronics. 1999, 46(5): 953-959) disclosed by Song Hong-Seok et al., for an asymmetric fault, negative sequence voltage feedforward and dual-sequence current inner loop control are respectively carried out, but only a negative sequence current can be suppressed. In the doctoral dissertation "Study on control and protection strategies of VSC-HVDC system for faulty alternating-current system" by Dr. Chen Hairong, detailed deduction is carried out for a positive sequence and negative sequence asymmetric fault. Based on the use of a dual sequence current loop, suppressing a negative sequence current is further divided into suppressing a negative sequence of the alternating-current side and suppressing a double frequency of the direct-current side. However, the two objectives cannot be achieved at the same time. All the derivation calculations above can only be used for controlling the negative sequence. The dissertation does not mention how to detect and position a faulty station when a fault occurs in a local station and the zero sequence voltage is transmitted to other converter stations through the converter station and how to rapidly restore system operation after positioning.

For dissemination of an unbalanced voltage containing a zero sequence voltage among voltage source converter stations in a transformerless connection manner, how to accurately position the fault becomes a difficult problem as the unbalanced voltage containing the zero sequence voltage can be detected in each station, and this affects the application and promotion of a flexible alternating-current and direct-current power transmission system that employs a transformerless connection manner. Therefore, it is necessary to find a method for accurate fault positioning and recovery of an alternating-current system of a converter station in a transformerless manner, thereby promoting the application of a voltage source converter without a transformer or with a transformer whose secondary side is grounded with high resistance, thus finally reducing occupied space, losses and costs of the converter station.

SUMMARY OF THE INVENTION

An objective of the present invention is to provide a method and system for fault positioning and recovery of a voltage source converter. Locking a converter station when it is detected that an alternating-current voltage contains a zero sequence voltage or a direct-current voltage contains an unbalanced voltage. Positioning a fault by continuing to detect value of the zero sequence voltage of an alternating-current side of the converter through locking a converter station device. Rapidly recovering the operation of each station after the fault is positioned. The method for fault positioning and recovery is simple, practical, has high reliability, and can effectively detect the problems that each station contains a zero sequence voltage of an alternating-current side and cannot easily position a fault caused due to transmission of the zero sequence voltage of the alternating-current side to an opposite-side alternating-current system via a voltage source converter. Meanwhile, by means of the recovery method, a non-faulty converter station can get rid of influences of a faulty converter station and recover rapidly, thereby isolating the fault of the faulty station from the alternating system of the non-faulty station.

In order to achieve the foregoing objective, the present invention employs the following technical solutions.

A method for fault positioning of a voltage source converter includes locking the converter when an alternating-current side zero sequence voltage Uo_ac or a direct-current side unbalanced voltage Uo_dc of a voltage source type converter station is detected greater than a set first threshold Uo_set1 for longer than a particular period of time Δt1. During the locking period, determining a converter station as a faulty station when the alternating-current side zero sequence voltage Uo_ac of a converter station is detected greater than a second threshold Uo_set2 for longer than a particular period of time Δt2 in the locking period, otherwise, determining the converter station as a non-faulty station.

In the foregoing method for fault positioning of a voltage source converter, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

In the foregoing method for fault positioning of a voltage source converter, in a step of locking the converter, each converter stations can be locked at the same time, or converter stations controlled by active power can be locked first and converter stations controlled by a direct-current voltage are then locked after it is detected to be faulty.

In the foregoing method for fault positioning of a voltage source converter, each converter stations can be locked at the same time. If the alternating-current side zero sequence voltage Uo_ac of a converter station stays greater than or equal to the set value Uo_set2 for longer than the particular period of time Δt2 in the locking period, the converter station is determined as a faulty station; otherwise, the converter station is determined as a non-faulty station.

In the foregoing method for fault positioning of a voltage source converter, the converter stations controlled by the active power can be locked first. During the locking period, for each converter station controlled by the active power, if the alternating-current side zero sequence voltage Uo_ac of the converter station stays greater than the set value Uo_set2 for longer than the particular period of time Δt2, the converter station controlled by the active power is determined as a faulty station; otherwise, the converter station controlled by the active power is determined as a non-faulty station.

In the foregoing method for fault positioning of a voltage source converter, characterized in that the stations controlled by the active power are locked. If the alternating-current side zero sequence voltage Uo_ac of a station controlled by the direct-current voltage stays greater than the set value Uo_set2 for longer than the particular period of time Δt2 during the locking period of the stations controlled by the active power, it is determined that the station controlled by the direct-current voltage is faulty. Further, the converter stations controlled by the direct-current voltage need to be locked, when the alternating-current side zero sequence voltage Uo_ac of a converter station controlled by the direct-current voltage is detected greater than the set value Uo_set2 for longer than the particular period of time Δt2, the converter station controlled by the direct-current voltage is determined as a faulty station; otherwise, the converter station controlled by the direct-current voltage is determined as a non-faulty station.

In the foregoing method for fault positioning of a voltage source converter, a value range of Uo_set1 is 0.01 times a rated alternating-current voltage to 0.8 times the rated alternating-current voltage. A value range of Δt1 is 0 s to 6000 s.

In the foregoing method for fault positioning of a voltage source converter, a value range of Uo_set2 is 0.01 times a rated alternating-current voltage to 0.8 times the rated alternating-current voltage. A value range of Δt2 is 0 s to 6000 s.

In the foregoing method for fault positioning of a voltage source converter, when the voltage source converter includes a full-bridge sub-module or a similar full-bridge sub-module topological structure, the full-bridge sub-module locks the converter in a full-locking manner or a half-locking manner.

In the foregoing method for fault positioning of a voltage source converter, when the voltage source converter is a half-bridge sub-module topological structure, the converter stations are locked in a locking manner.

In the foregoing system for fault positioning of a voltage source converter, a system for fault positioning of a voltage source converter station includes a detection module, a locking module and a fault determining and positioning module. When the detection module detects that an alternating-current side zero sequence voltage Uo_ac or a direct-current side unbalanced voltage Uo_dc of a converter station stays greater than a set value Uo_set1 for longer than a particular period of time Δt1, the locking module locks the converter. For each converter station, when the alternating-current side zero sequence voltage Uo_ac of a converter station stays greater than a set value Uo_set2 for longer than a particular period of time Δt2 during the locking period, the fault determining and positioning module determines the converter station as a faulty station; otherwise, the fault determining and positioning module determines the converter station as a non-faulty station.

In the foregoing system for fault positioning of a voltage source converter, in the detection module, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

In the foregoing system for fault positioning of a voltage source converter, the locking module can lock each converter station at the same time, or first lock converter stations controlled by active power. Determine whether to lock converter stations controlled by a direct-current voltage or not according to a fault positioning condition.

In the foregoing system for fault positioning of a voltage source converter, when each converter station is locked at the same time, if the alternating-current side zero sequence voltage Uo_ac of a converter station stays greater than or equal to the set value Uo_set2 for longer than the particular period of time Δt2 during the locking period, the converter station is determined as a faulty station; otherwise, the converter station is determined as a non-faulty station.

In the foregoing method system for fault positioning of a voltage source converter, the converter stations controlled by the active power are locked first. For each converter station controlled by the active power, if the alternating-current side zero sequence voltage Uo_ac of the converter station is detected greater than the set value Uo_set2 for longer than the particular period of time Δt2 during the locking period, the fault determining and positioning module determines the converter station controlled by the active power as a faulty station; otherwise, the fault determining and positioning module determines the converter station controlled by the active power as a non-faulty station.

In the foregoing system for fault positioning of a voltage source converter, when the stations controlled by the active power are locked first. If the alternating-current side zero sequence voltage Uo_ac of a station controlled by the direct-current voltage is detected greater than the set value Uo_set2 for longer than the particular period of time Δt2 during the locking period of the stations controlled by the active power, the fault determining and positioning module determines that the fault occurs in the station controlled by the direct-current voltage. The converter stations controlled by the direct-current voltage need to be further locked. If the alternating-current side zero sequence voltage Uo_ac of a converter station controlled by the direct-current voltage is detected greater than the set value Uo_set2 for longer than the particular period of time Δt2, the converter station controlled by the direct-current voltage is determined as a faulty station; otherwise, the converter station controlled by the direct-current voltage is determined as a non-faulty station.

In the foregoing system for fault positioning of a voltage source converter, a value range of Uo_set1 is 0.01 times a rated alternating-current voltage to 0.8 times the rated alternating-current voltage. A value range of Δt1 is 0 s to 6000 s. A value of Uo_set2 is 0.01 times the rated alternating-current voltage to 0.8 times the rated alternating-current voltage. A value range of Δt2 is 0 s to 6000 s.

In the foregoing system for fault positioning of a voltage source converter, when the voltage source converter includes a full-bridge sub-module or a similar full-bridge sub-module topological structure, the converter is locked in a full-locking manner or a half-locking manner.

In the foregoing system for fault positioning of a voltage source converter, when the voltage source converter is a half-bridge sub-module topological structure, the converter stations are locked in a locking manner.

The present invention further provides a method for fault recovery of a voltage source converter. Locking the converter when an alternating-current side zero sequence voltage Uo_ac or a direct-current side unbalanced voltage Uo_dc of a voltage source converter station is detected greater than a set value Uo_set1 for longer than a particular period of time Δt1. For each converter station, if the alternating-current side zero sequence voltage Uo_ac of the converter station is detected greater than a set value Uo_set2 for longer than a particular period of time Δt2 in the locking period, determining the converter station as a faulty station; otherwise, determining the converter station as a non-faulty station. Unlocking and recovering operation of non-faulty stations after the faulty station is determined, where the faulty station can be unlocked to recover operation after the alternating-current side zero sequence voltage Uo_ac stays no greater than a set value Uo_set3 for longer than a particular period of time Δt3, or the faulty station can be directly unlocked to recover operation after being put into control of a zero sequence voltage.

In the foregoing method for fault recovery of a voltage source converter, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing the sum of a positive direct-current voltage and a negative direct-current voltage by 2, and then taking an effective value after band-pass filtering.

In the foregoing method for fault recovery of a voltage source converter, each converter station is locked at the same time after the zero sequence voltage or unbalanced voltage is detected to meet a requirement. If the alternating-current side zero sequence voltage Uo_ac of a converter station stays greater than or equal to the value Uo_set2 for longer than the particular period of time Δt2 during the locking period, the converter station is determined as a faulty station; otherwise, the converter station is determined as a non-faulty station. The non-faulty stations are unlocked to recover operation after the faulty station is determined. Among the non-faulty stations, stations controlled by a direct-current voltage are first unlocked to recover operation, and stations controlled by active power are then unlocked to recover operation. The faulty station is unlocked to recover operation after the alternating-current side zero sequence voltage Uo_ac of the faulty station is detected no greater than the set value Uo_set3 for longer than the particular period of time Δt3.

In the foregoing method for fault recovery of a voltage source converter, each converter station is locked at the same time. If the alternating-current side zero sequence voltage Uo_ac of a converter station stays greater than or equal to the set value Uo_set2 for longer than the particular period of time Δt2 during the locking period, the converter station is determined as a faulty station; otherwise, the converter station is determined as a non-faulty station. The non-faulty stations are unlocked to recover operation after the faulty station is determined. Among the non-faulty stations, stations controlled by a direct-current voltage are first unlocked to recover operation, and stations controlled by active power are then unlocked to recover operation. The faulty station is unlocked to recover operation after being put into control of the zero sequence voltage.

In the foregoing method for fault recovery of a voltage source converter, converter stations controlled by active power are locked first. For each converter station controlled by the active power, if the alternating-current side zero sequence voltage Uo_ac of the converter station stays greater than the set value Uo_set2 for longer than the particular period of time Δt2 during the locking period, the converter station controlled by the active power is determined as a faulty station; otherwise, the converter station controlled by the active power is determined as a non-faulty station. Other non-faulty stations controlled by the active power are unlocked to recover operation, and the faulty converter station controlled by the active power can be unlocked to recover operation after the alternating-current side zero sequence voltage Uo_ac is detected no greater than the set value Uo_set3 for longer than the particular period of time Δt3, or the faulty converter station controlled by the active power can be directly unlocked to recover operation after being put into control of the zero sequence voltage.

In the foregoing method for fault recovery of a voltage source converter, first locking stations controlled by active power. If the alternating-current side zero sequence voltage Uo_ac of a station controlled by a direct-current voltage stays greater than the set value Uo_set2 for longer than the particular period of time Δt2 during the locking period of the stations controlled by the active power, the station controlled by the direct-current voltage is determined as a faulty station. The converter stations controlled by the direct-current voltage need to be further locked. If the alternating-current side zero sequence voltage Uo_ac of a converter station controlled by the direct-current voltage is detected greater than the set value Uo_set2 for longer than the particular period of time Δt2, the converter station controlled by the direct-current voltage is determined as a faulty station; otherwise, the converter station controlled by the direct-current voltage is determined as a non-faulty station. If there is non-faulty station controlled by the direct-current voltage except the faulty station controlled by the direct-current voltage, the non-faulty station controlled by the direct-current voltage is unlocked to recover operation, and then the stations controlled by the active power are unlocked to recover operation. The faulty station controlled by the direct-current voltage can be unlocked to recover operation after the alternating-current side zero sequence voltage Uo_ac is detected no greater than the set value Uo_set3 for longer than the particular period of time Δt3, or can be directly unlocked to recover operation after being put into control of the zero sequence voltage. If there is no non-faulty station controlled by the direct-current voltage except the faulty station controlled by the direct-current voltage, the faulty station controlled by the direct-current voltage can be directly unlocked to recover operation after being put into control of the zero sequence voltage, and then the stations controlled by the active power are unlocked to recover operation. Alternatively, a station controlled by the active power can be converted into a station controlled by the direct-current voltage and unlocked to recover operation first, other stations controlled by the active power are then unlocked to recover operation, and the faulty station controlled by the direct-current voltage is unlocked to recover operation after the alternating-current side zero sequence voltage Uo_ac is detected no greater than the set value Uo_set3 for longer than the particular period of time Δt3.

In the foregoing method for fault recovery of a voltage source converter, a zero sequence voltage reference value Uoref generated through detection and control of the zero sequence voltage is superposed to an original voltage reference wave Uref to generate a new voltage reference wave Uref_new for controlling the zero sequence voltage.

In the foregoing method for fault recovery of a voltage source converter, calculating the zero sequence voltage Uo_ac according to an alternating-current voltage is dividing a sum of alternating-current voltages of three phases by 3. Calculating the zero sequence voltage Uo_dc according to a direct-current voltage is dividing a sum of a positive voltage and a negative voltage by 2. A selector selects Uo_ac or Uo_dc as Uoref.

In the foregoing method for fault recovery of a voltage source converter, a value range of Uo_set1 is 0.01 times a rated alternating-current voltage to 0.8 times the rated alternating-current voltage. A value range of Δt1 is 0 s to 6000 s. A value range of Uo_set2 is 0.01 times the rated alternating-current voltage to 0.8 times the rated alternating-current voltage. A value range of Δt2 is 0 s to 6000 s. A value range of Uo_set3 is 0.01 times the rated alternating-current voltage to 0.8 times the rated alternating-current voltage. A value range of Δt3 is 0 s to 6000 s.

In the foregoing method for fault recovery of a voltage source converter, when the voltage source converter includes a full-bridge sub-module or a similar full-bridge sub-module topological structure, the converter is locked in a full-locking manner or a half-locking manner.

In the foregoing method for fault recovery of a voltage source converter, when the voltage source converter is a half-bridge sub-module topological structure, the converter stations are locked in a locking manner.

In addition to the method for fault recovery of a voltage source converter, the present invention further provides a system for fault recovery of a voltage source converter. The system for fault recovery of a voltage source converter station includes a detection module, a locking module, a fault determining and positioning module, and a fault recovery module. The locking module locks the converter when the detection module detects that an alternating-current side zero sequence voltage Uo_ac or a direct-current side unbalanced voltage Uo_dc stays greater than a set value Uo_set1 for longer than a particular period of time Δt1. For each converter station, if the alternating-current side zero sequence voltage Uo_ac of the converter station is detected greater than a set value Uo_set2 for longer than a particular period of time Δt2 during the locking period, the fault determining and positioning module determines the converter station as a faulty station; otherwise, the fault determining and positioning module determines the converter station as a non-faulty station. The fault recovery module unlocks and recovers operation of non-faulty stations after the faulty station is determined. The faulty station can be unlocked to recover operation after the alternating-current side zero sequence voltage Uo_ac of the faulty station stays no greater than a set value Uo_set3 for longer than a particular period of time Δt3, or the faulty station can be directly unlocked to recover operation after being put into control of a zero sequence voltage.

In the foregoing system for fault recovery of a voltage source converter, in the detection module, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

In the foregoing system for fault recovery of a voltage source converter, the locking module locks each converter station at the same time. If the alternating-current side zero sequence voltage Uo_ac of a converter station is detected greater than or equal to the set value Uo_set2 for longer than the particular period of time Δt2 during the locking period, the fault determining and positioning module determines the converter station as a faulty station; otherwise, the fault determining and positioning module determines the converter station as a non-faulty station. The fault recovery module unlocks and recovers operation of the non-faulty stations after the faulty station is determined. Among the non-faulty stations, stations controlled by a direct-current voltage are first unlocked to recover operation, and stations controlled by active power are then unlocked to recover operation. The faulty station is unlocked to recover operation after the alternating-current side zero sequence voltage Uo_ac of the faulty station is detected less than the set value Uo_set3 for longer than the particular period of time Δt3.

In the foregoing system for fault recovery of a voltage source converter, the locking module locks each converter station at the same time. If the alternating-current side zero sequence voltage Uo_ac of a converter station is detected greater than or equal to the set value Uo_set2 for longer than the particular period of time Δt2 during the locking period, the fault determining and positioning module determines the converter station as a faulty station; otherwise, the fault determining and positioning module determines the converter station as a non-faulty station. The fault recovery module unlocks and recovers operation of the non-faulty stations after the faulty station is determined. Among the non-faulty stations, stations controlled by a direct-current voltage are unlocked to recover operation first and then stations controlled by active power are unlocked to recover operation; and the faulty station is unlocked to recover operation after being put into control of the zero sequence voltage.

In the foregoing system for fault recovery of a voltage source converter, the locking module locks converter stations controlled by active power. For each converter station controlled by the active power, if the alternating-current side zero sequence voltage Uo_ac of the converter station is detected greater than the set value Uo_set2 for longer than the particular period of time Δt2 in the locking period, the fault determining and positioning module determines the converter station controlled by the active power as a faulty station; otherwise, the fault determining and positioning module determines the converter station controlled by the active power as a non-faulty station. The fault recovery module unlocks and recovers operation of other non-faulty stations controlled by the active power after the faulty station is determined. The faulty converter station controlled by the active power can be unlocked to recover operation after the alternating-current side zero sequence voltage Uo_ac is detected no greater than the set value Uo_set3 for longer than the particular period of time Δt3, or the faulty converter station controlled by the active power can be directly unlocked to recover operation after being put into control of the zero sequence voltage.

In the foregoing system for fault recovery of a voltage source converter, the locking module locks stations controlled by the active power. If the alternating-current side zero sequence voltage Uo_ac of a station controlled by a direct-current voltage is detected greater than the set value Uo_set2 for longer than the particular period of time Δt2 in the locking period of the stations controlled by the active power, the fault determining and positioning module determines that the fault occurs in the station controlled by the direct-current voltage. After the station controlled by the direct-current voltage is monitored to be faulty, the converter stations controlled by the direct-current voltage need to be further locked. If the alternating-current side zero sequence voltage Uo_ac of a converter station controlled by the direct-current voltage is detected greater than the set value Uo_set2 for longer than the particular period of time Δt2, the fault determining and positioning module determines the converter station controlled by the direct-current voltage as a faulty station; otherwise, the fault determining and positioning module determines the converter station controlled by the direct-current voltage as a non-faulty station. If there is non-faulty station controlled by the direct-current voltage except the faulty station controlled by the direct-current voltage, the fault recovery module unlocks and recovers operation of the non-faulty station controlled by the direct-current voltage, and then unlocks and recovers operation of the stations controlled by the active power. The faulty station controlled by the direct-current voltage can be unlocked to recover operation after the alternating-current side zero sequence voltage Uo_ac of the faulty station is detected no greater than the set value Uo_set3 for longer than the particular period of time Δt3, or can be directly unlocked to recover operation after being put into control of the zero sequence voltage. If there is no non-faulty station controlled by the direct-current voltage except the faulty station controlled by the direct-current voltage, the fault recovery module can directly unlock and recover operation of the faulty station controlled by the direct-current voltage after the faulty station is put into control of the zero sequence voltage, and then unlock and recover operation of the stations controlled by the active power. Alternatively, the fault recovery module can convert a station controlled by the active power into a station controlled by the direct-current voltage to first unlock and recover operation of the station, and then unlock and recover operation of other stations controlled by the active power. The faulty station controlled by the direct-current voltage is unlocked to recover operation after the alternating-current side zero sequence voltage Uo_ac of the faulty station is detected no greater than the set value Uo_set3 for longer than the particular period of time Δt3.

In the foregoing system for fault recovery of a voltage source converter, a zero sequence voltage reference value Uoref generated through detection and control of the zero sequence voltage is superposed to an original voltage reference wave Uref to generate a new voltage reference wave Uref_new for performing control.

In the foregoing system for fault recovery of a voltage source converter, calculating the zero sequence voltage Uo_ac according to an alternating-current voltage is dividing a sum of alternating-current voltages of three phases by 3. Calculating the zero sequence voltage Uo_dc according to a direct-current voltage is dividing a sum of a positive voltage and a negative voltage by 2. A selector selects Uo_ac or Uo_dc as Uoref.

In the foregoing system for fault recovery of a voltage source converter, a value range of Uo_set1 is 0.01 times a rated alternating-current voltage to 0.8 times the rated alternating-current voltage. A value range of Δt1 is 0 s to 6000 s. A value range of Uo_set2 is 0.01 times the rated alternating-current voltage to 0.8 times the rated alternating-current voltage. A value range of Δt2 is 0 s to 6000 s. A value range of Uo_set3 is 0.01 times the rated alternating-current voltage to 0.8 times the rated alternating-current voltage. A value range of Δt3 is 0 s to 6000 s.

In the foregoing system for fault recovery of a voltage source converter, when the voltage source converter includes a full-bridge sub-module or a similar full-bridge sub-module topological structure, the converter is locked in a full-locking manner or a half-locking manner.

In the foregoing system for fault recovery of a voltage source converter, when the voltage source converter is a half-bridge sub-module topological structure, the converter stations are locked in a locking manner.

By using the foregoing solutions, the present invention achieves the following beneficial effects:

(1) The method for fault positioning is simple, practical, has high reliability, and can effectively detect the problems that each station contains a zero sequence voltage of an alternating-current side and cannot easily position a fault caused due to transmission of the zero sequence voltage of the alternating-current side to an opposite-side alternating-current system via a voltage source converter.

(2) After the method for fault positioning determines a faulty side, by means of the recovery method, a non-faulty converter station can get rid of influences of a faulty converter station for rapid recovery, thereby isolating the fault of the faulty station from the alternating system of the non-faulty station. Meanwhile, the provided fault recovery method can further ensure continuous operation during the fault period of the faulty station.

(3) After adopting the method for fault positioning and recovery, the application of a transformerless connecting method in the voltage source converter can be promoted, thereby achieving the objectives of reducing occupied space, reducing losses, and reducing manufacture costs.

DETAILED DESCRIPTION OF THE INVENTION

The technical solutions of the present invention will be described in detail below with reference to the accompanying drawings and specific embodiments.

The present invention provides a method for fault positioning and recovery, which can effectively detect the problems that each station contains a zero sequence voltage of an alternating-current side and cannot easily position a fault caused due to transmission of the zero sequence voltage of the alternating-current side to an opposite-side alternating-current system via a voltage source converter to an opposite-side alternating-current system. By means of the fault recovery method, a non-faulty converter station can get rid of influences of a faulty converter station for rapid recovery, thereby isolating the fault of the faulty station from the alternating system of the non-faulty station. Meanwhile, the provided fault recovery method can further ensure continuous operation during the fault period of the faulty station.

FIG. 1 is a schematic diagram of two terminals flexible direct-current power transmission. The two terminals flexible direct-current power transmission system is taken as an example for description, and the method is also adapted for a direct-current power transmission and distribution grid.

Figure 5:
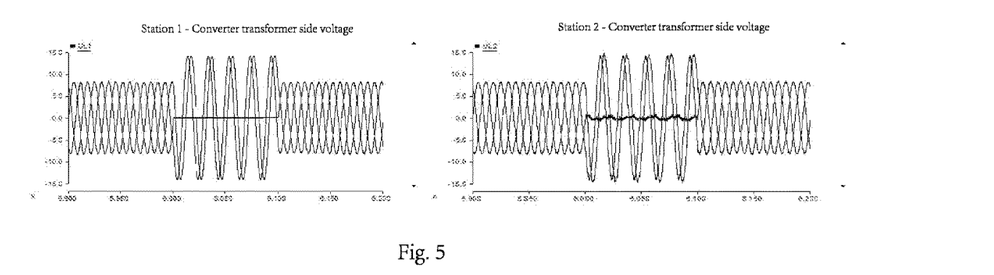
FIG. 5 is a fault simulation waveform diagram of a station 1 and a station 2 that continue unlocking operation without the control of a superposed zero sequence voltage when k2 single-phase grounding fault in FIG. 1 occurs.

The flexible direct-current power transmission employs a transformerless connection method, and an alternating-current system is a system grounded through an arc suppression coil. A C-phase fault occurs in a station 1, and a non-faulty phase voltage of the station 1 rises to $\sqrt{3}$ times the original phase voltage before the fault occurs. The cut phase changes, and the three phases contain a zero sequence voltage. The alternating-current voltage of a station 2 also contains the zero sequence voltage. When initial phases of the alternating-current voltages of the station 1 and the station 2 are exactly the same, the waveform of the station 2 is as shown in FIG. 1. The station 2 also senses to the zero sequence induced voltage so voltages of the three phases become unbalanced. Simulation waveform under the actual situations of the faulty station 1 and the non-faulty station 2 are as shown in FIG. 5. A graph of a faulty three-phase alternating-current voltage is on the left of FIG. 5, and a graph of an alternating-current voltage of a non-faulty station is on the right of FIG. 5. How to accurately determine a station that has an alternating-current system fault in two or more stations is a difficult problem. In order to accurately position the fault, the converter is locked when an alternating-current side zero sequence voltage Uo_ac or a direct-current side unbalanced voltage Uo_ac of a voltage source converter station is detected greater than a set value Uo_set1 for longer than a particular period of time $\Delta t1$. If the alternating-current side zero sequence voltage Uo_ac of a converter station is detected greater than a set value Uo_set2 for longer than a particular period of time $\Delta t2$ during the locking period, the converter station is determined as a faulty station; otherwise, the converter station is determined as a non-faulty station. FIG. 2 is a schematic waveform diagram when both stations are locked or any one of the stations controlled by active power is locked. It can be learned from the figure that, the non-faulty station 2 does not have a zero sequence alternating-current voltage after locking, and the faulty station can be accurately positioned according to different characteristics of the two stations after locking.

The alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

Further, in the step of locking the converter in FIG. 2, each converter station can be locked at the same time, or converter stations controlled by active power can be first locked and converter stations controlled by a direct-current voltage are then locked after it is detected that the fault occurs in a converter station controlled by the direct-current voltage.

Meanwhile, during the locking period, if the alternating-current side zero sequence voltage Uo_ac of a converter station stays greater than or equal to the set value Uo_set2 for longer than the particular period of time $\Delta t2$, the converter station is determined as a faulty station; otherwise, the converter station is determined as a non-faulty station.

When the converter stations controlled by the active power are locked first, for each converter station controlled by the active power, if the alternating-current side zero sequence voltage Uo_ac of the converter station stays greater than the set value Uo_set2 for longer than the particular period of time $\Delta t2$ during the locking period, the converter station controlled by the active power is determined as a faulty station; otherwise, the converter station controlled by the active power is determined as a non-faulty station. If the alternating-current side zero sequence voltage Uo_ac of a station controlled by the direct-current voltage stays greater than the set value Uo_set2 for longer than the particular period of time Δt2 during the locking period of the stations controlled by the active power, it is determined that the fault occurs in the station controlled by the direct-current voltage, the converter stations controlled by the direct-current voltage need to be further locked, and if the alternating-current side zero sequence voltage Uo_ac of a converter station controlled by the direct-current voltage is detected greater than the set value Uo_set2 for longer than the particular period of time Δt2, the converter station controlled by the direct-current voltage is determined as a faulty station; otherwise, the converter station controlled by the direct-current voltage is determined as a non-faulty station.

Further, value ranges of the set values are as follows: a value range of Uo_set1 is 0.01 times a rated alternating-current voltage to 0.8 times the rated alternating-current voltage, and a value range of Δt1 is 0 s to 6000 s. A value range of Uo_set2 is 0.01 times the rated alternating-current voltage to 0.8 times the rated alternating-current voltage, and a value range of Δt2 is 0 s to 6000 s.

In the method for fault positioning of a voltage source converter, when the converter includes a full-bridge sub-module or a similar full-bridge sub-module topological structure, the full-bridge sub-module, the similar full-bridge sub-module and a clamp double sub-module lock the converter in a full-locking manner or a half-locking manner. On/off states of the similar full-bridge and full-bridge half-locking sub-modules are as shown in Table 2 and Table 3:

TABLE 2

Working states of similar full-bridge sub-module

| State | T1 | T2 | T4 | $U_{SM}$ |
| --- | --- | --- | --- | --- |
| Full locking | OFF | OFF | OFF | +Uc/Uc |
| Half locking | OFF | OFF | ON | +Uc/0 |

TABLE 3

Working states of full-bridge sub-module

| State | T1 | T2 | T3 | T4 | $U_{SM}$ |
| --- | --- | --- | --- | --- | --- |
| Full locking | OFF | OFF | OFF | OFF | +Uc/Uc |
| Halflocking 1 | OFF | OFF | OFF | ON | +Uc/0 |
| Half locking 2 | OFF | OFF | ON | OFF | 0/Uc |
| Half locking 3 | ON | OFF | OFF | OFF | +Uc/0 |
| Half locking 4 | ON | ON | OFF | OFF | 0/Uc |

On/off states of the clamp double sub-module are as shown in Table 4:

TABLE 4

Working states of clamp double sub-module

| State | T1 | T2 | T3 | T4 | T5 | $U_{SM}$ |
| --- | --- | --- | --- | --- | --- | --- |
| Full locking | OFF | OFF | OFF | OFF | OFF | +2Uc/2Uc |
| Half locking 1 | OFF | OFF | OFF | OFF | ON | +2Uc/0 |

When the voltage source converter is of a half-bridge sub-module topological structure, the converter stations are locked in a locking manner. On/off states of the half-bridge topological structure locking sub-module are as shown in Table 1:

TABLE 1

Working states of half-bridge sub-module

| State | T1 | T2 | $U_{SM}$ |
| --- | --- | --- | --- |
| Locking | OFF | OFF | +Uc/0 |

The system for fault positioning of a voltage source converter according to the present invention is specifically implemented as follows: The system for fault positioning of a voltage source converter station includes: a detection module, a locking module, and a fault determining and positioning module. The locking module locks the converter when the detection module detects that an alternating-current side zero sequence voltage Uo_ac or a direct-current side unbalanced voltage Uo_dc of a converter station stays greater than a set value Uo_set1 for longer than a particular period of time Δt1; and for each converter station, if the alternating-current side zero sequence voltage Uo_ac of the converter station is detected greater than a set value Uo_set2 for longer than a particular period of time Δt2 during the locking period, the fault determining and positioning module determines the converter station as a faulty station; otherwise, the fault determining and positioning module determines the converter station as a non-faulty station.

In the detection module of the positioning system, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

The locking module can lock each converter station at the same time, or first lock converter stations controlled by active power and then determine whether to lock stations controlled by a direct-current voltage according to a fault positioning status.

When the fault positioning system locks all of the converter stations, if the alternating-current side zero sequence voltage Uo_ac of a converter station stays greater than or equal to the set value Uo_set2 for longer than the particular period of time Δt2 during the locking period, the converter station is determined as a faulty station; otherwise, the converter station is determined as a non-faulty station. The schematic waveform diagram is as shown in FIG. 2.

When the fault positioning system first locks the converter stations controlled by the active power, for each converter station controlled by the active power, if the alternating-current side zero sequence voltage Uo_ac of the converter station is detected greater than the set value Uo_set2 for longer than the particular period of time Δt2 during the locking period, the fault determining and positioning module determines the converter station controlled by the active power as a faulty station; otherwise, the fault determining and positioning module determines the converter station controlled by the active power as a non-faulty station. If the alternating-current side zero sequence voltage Uo_ac of a station controlled by the direct-current voltage is detected greater than the set value Uo_set2 for longer than the particular period of time Δt2 during the locking period of the stations controlled by the active power, the fault determining and positioning module determines that the fault occurs in the station controlled by the direct-current voltage. Further, the converter stations controlled by the direct-current voltage need to be locked, and if the alternating-current side zero sequence voltage Uo_ac of a converter station controlled by the direct-current voltage is detected greater than the set value Uo_set2 for longer than the particular period of time Δt2, the converter station controlled by the direct-current voltage is determined as a faulty station; otherwise, the converter station controlled by the direct-current voltage is determined as a non-faulty station.

In the foregoing system for fault positioning of a voltage source converter, a value range of Uo_set1 is 0.01 times a rated alternating-current voltage to 0.8 times the rated alternating-current voltage, and a value range of Δt1 is 0 s to 6000 s. A value range of Uo_set2 is 0.01 times the rated alternating-current voltage to 0.8 times the rated alternating-current voltage, and a value range of Δt2 is 0 s to 6000 s.

In the foregoing system for fault positioning of a voltage source converter, when the converter includes a full-bridge sub-module or a similar full-bridge sub-module topological structure, the full-bridge sub-module, the similar full-bridge sub-module and a clamp double sub-module lock the converter in a full-locking manner or a half-locking manner. On/off states of the similar full-bridge and full-bridge half-locking sub-modules are as shown in Table 2 and Table 3. On/off states of the clamp double sub-module are as shown in Table 4. When the voltage source converter is a half-bridge sub-module topological structure, the converter stations are locked in a locking manner. On/off states of the half-bridge topological structure locking sub-module are as shown in Table 1.

Based on the fault positioning, a method for fault recovery of a voltage source converter is researched. The method includes locking the converter when an alternating-current side zero sequence voltage Uo_ac or a direct-current side unbalanced voltage Uo_dc of a voltage source converter station is detected greater than a set value Uo_set1 for longer than a particular period of time Δt1. For each converter station, if the alternating-current side zero sequence voltage Uo_ac of a converter station is detected greater than a set value Uo_set2 for longer than a particular period of time Δt2 during the locking period, determining the converter station as a faulty station; otherwise, determining the converter station as a non-faulty station. And, unlocking and recovering operation of non-faulty stations after the faulty station is determined, where the faulty station can be unlocked to recover operation after the alternating-current side zero sequence voltage Uo_ac stays no greater than a set value Uo_set3 for longer than a particular period of time Δt3, or the faulty station can be directly unlocked to recover operation after being put into control of a zero sequence voltage.

In the method for fault recovery of a voltage source converter, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

In the method for fault recovery of a voltage source converter, each converter station is locked at the same time after the zero sequence voltage or unbalanced voltage is detected to meet a requirement, and if the alternating-current side zero sequence voltage Uo_ac of a converter station stays greater than or equal to the value Uo_set2 for longer than the particular period of time Δt2 during the locking period, the converter station is determined as a faulty station; otherwise, the converter station is determined as a non-faulty station. The non-faulty stations are unlocked to recover operation after the faulty station is determined. Among the non-faulty stations, stations controlled by a direct-current voltage are first unlocked to recover operation, and stations controlled by active power are then unlocked to recover operation. The faulty station is unlocked to recover operation after the alternating-current side zero sequence voltage Uo_ac of the faulty station is detected no greater than the set value Uo_set3 for longer than the particular period of time Δt3.

In a method for fault recovery of a voltage source converter, when a step that each converter station is locked at the same time is adopted, and if the alternating-current side zero sequence voltage Uo_ac of a converter station stays greater than or equal to the set value Uo_set2 for longer than the particular period of time Δt2 during the locking period, the converter station is determined as a faulty station; otherwise, the converter station is determined as a non-faulty station. The non-faulty stations are unlocked to recover operation after the faulty station is determined. Among the non-faulty stations, stations controlled by a direct-current voltage are first unlocked to recover operation, and stations controlled by active power are then unlocked to recover operation. The faulty station is unlocked to recover operation after being put into control of the zero sequence voltage.

In a method for fault recovery of a voltage source converter, converter stations controlled by active power are locked first, and for each converter station controlled by the active power, if the alternating-current side zero sequence voltage Uo_ac of the converter station stays greater than the set value Uo_set2 for longer than the particular period of time Δt2 during the locking period, the converter station controlled by the active power is determined as a faulty station; otherwise, the converter station controlled by the active power is determined as a non-faulty station. Other non-faulty stations controlled by the active power are unlocked to recover operation, and the faulty converter station controlled by the active power can be unlocked to recover operation after the alternating-current side zero sequence voltage Uo_ac is detected no greater than the set value Uo_set3 for longer than the particular period of time Δt3, or the faulty converter station controlled by the active power can be directly unlocked to recover operation after being put into control of the zero sequence voltage.

Further, if the alternating-current side zero sequence voltage Uo_ac of a station controlled by a direct-current voltage stays greater than the set value Uo_set2 for longer than the particular period of time Δt2 during the locking period of the stations controlled by the active power, it is determined that the fault occurs in the station controlled by the direct-current voltage. The converter stations controlled by the direct-current voltage need to be further locked, and if the alternating-current side zero sequence voltage Uo_ac of a converter station controlled by the direct-current voltage is detected greater than the set value Uo_set2 for longer than the particular period of time Δt2, the converter station controlled by the direct-current voltage is determined as a faulty station; otherwise, the converter station controlled by the direct-current voltage is determined as a non-faulty station. If there is any non-faulty station controlled by the direct-current voltage except the faulty station controlled by the direct-current voltage, the non-faulty station controlled by the direct-current voltage is unlocked to recover operation, and the stations controlled by the active power are then unlocked to recover operation. The faulty station controlled by the direct-current voltage can be unlocked to recover operation after the alternating-current side zero sequence voltage Uo_ac is detected no greater than the set value Uo_set3 for longer than the particular period of time Δt3, or can be directly unlocked to recover operation after being put into control of the zero sequence voltage. If there is no non-faulty station controlled by the direct-current voltage except the faulty station controlled by the direct-current voltage, the faulty station controlled by the direct-current voltage can be directly unlocked to recover operation after being put into control of the zero sequence voltage, and then the stations controlled by the active power are unlocked to recover operation. Alternatively, a station controlled by the active power can be converted into a station controlled by the direct-current voltage and first unlocked to recover operation, other stations controlled by the active power are then unlocked to recover operation, and the faulty station controlled by the direct-current voltage is unlocked to recover operation after the alternating-current side zero sequence voltage Uo_ac is detected no greater than the set value Uo_set3 for longer than the particular period of time Δt3.

Figure 4:
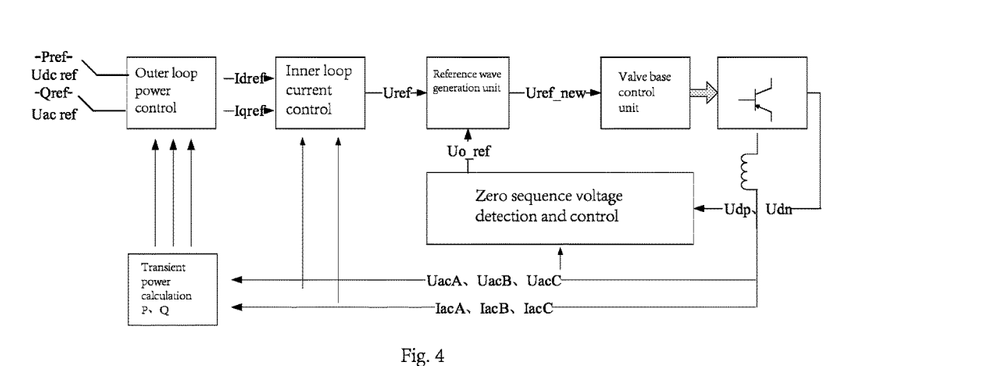
FIG. 4 is a control structural diagram showing that a faulty station controlled by a superposed zero sequence voltage recovers operation.

In the method for fault recovery of a voltage source converter, a zero sequence voltage reference value Uoref generated through detection and control of the zero sequence voltage is superposed to a voltage reference wave Uref to generate a new voltage reference wave Uref_new for controlling the zero sequence voltage, where the voltage reference wave Uref is based on positive and negative sequence control and is generated through outer loop power control and inner loop current control. A method for calculating the zero sequence voltage Uo_ac according to an alternating-current voltage is to divide a sum of alternating-current voltages of three phases by 3, and a method for calculating the zero sequence voltage Uo_dc according to a direct-current voltage is to divide a sum of a positive voltage and a negative voltage by 2, and a selector selects Uo_ac or Uo_dc as Uoref. A control block diagram in detail is shown in FIG. 4.

In a method for fault recovery of a voltage source converter, according to characteristics of the fault, value ranges of the fault set values are as follows: a value range of Uo_set1 is 0.01 times a rated alternating-current voltage to 0.8 times the rated alternating-current voltage, and a value range of Δt1 is 0 s to 6000 s; a value range of Uo_set2 is 0.01 times the rated alternating-current voltage to 0.8 times the rated alternating-current voltage, and a value range of Δt2 is 0 s to 6000 s; a value range of Uo_set3 is 0.01 times the rated alternating-current voltage to 0.8 times the rated alternating-current voltage, and a value range of Δt3 is 0 s to 6000 s.

In a method for fault recovery of a voltage source converter, when the converter includes a full-bridge sub-module or a similar full-bridge sub-module topological structure, the full-bridge sub-module, the similar full-bridge sub-module and a clamp double sub-module lock the converter in a full-locking manner or a half-locking manner. On/off states of the similar full-bridge and full-bridge half-locking sub-modules are as shown in Table 2 and Table 3:

TABLE 2

Working states of similar full-bridge sub-module

| State | T1 | T2 | T4 | $U_{SM}$ |
|---|---|---|---|---|
| Full locking | OFF | OFF | OFF | +Uc/Uc |
| Half locking | OFF | OFF | ON | +Uc/0 |

TABLE 3

Working states of full-bridge sub-module

| State | T1 | T2 | T3 | T4 | $U_{SM}$ |
|---|---|---|---|---|---|
| Full locking | OFF | OFF | OFF | OFF | +Uc/Uc |
| Half locking 1 | OFF | OFF | OFF | ON | +Uc/0 |
| Half locking 2 | OFF | OFF | ON | OFF | 0/Uc |
| Half locking 3 | ON | OFF | OFF | OFF | +Uc/0 |
| Half locking 4 | ON | ON | OFF | OFF | 0/Uc |

On/off states of the clamp double sub-module are as shown in Table 4:

TABLE 4

Working states of clamp double sub-module

| State | T1 | T2 | T3 | T4 | T5 | $U_{SM}$ |
|---|---|---|---|---|---|---|
| Full locking | OFF | OFF | OFF | OFF | OFF | +2Uc/2Uc |
| Half locking 1 | OFF | OFF | OFF | OFF | ON | +2Uc/0 |

When the voltage source converter is of a half-bridge sub-module topological structure, the converter stations are locked in a locking manner. On/off states of the half-bridge topological structure locking sub-module are as shown in Table 1:

TABLE 1

Working states of half-bridge sub-module

| State | T1 | T2 | $U_{SM}$ |
|---|---|---|---|
| Locking | OFF | OFF | +Uc/0 |

Further, in addition to the method for fault recovery of a voltage source converter, the present invention further provides a system for fault recovery of a voltage source converter. The system for fault recovery of a voltage source converter station includes a detection module, a locking module, a fault determining and positioning module, and a fault recovery module. The locking module locks the converter when the detection module detects that an alternating-current side zero sequence voltage Uo_ac or a direct-current side unbalanced voltage Uo_dc stays greater than a set value Uo_set1 for longer than a particular period of time Δt1. For each converter station, if the alternating-current side zero sequence voltage Uo_ac of the converter station is detected greater than a set value Uo_set2 for longer than a particular period of time Δt2 during the locking period, the fault determining and positioning module determines the converter station as a faulty station; otherwise, the fault determining and positioning module determines the converter station as a non-faulty station. The fault recovery module unlocks and recovers operation of non-faulty stations after the faulty station is determined, where the faulty station can be unlocked to recover operation after the alternating-current side zero sequence voltage Uo_ac of the faulty station stays no greater than a set value Uo_set3 for longer than a particular period of time Δt3, or the faulty station can be directly unlocked to recover operation after being put into control of a zero sequence voltage.

In a system for fault recovery of a voltage source converter, in the detection module, the alternating-current side zero sequence voltage Uo_ac is calculated by dividing a sum of alternating-current voltages of three phases by 3, and then taking an effective value after band-pass filtering. The direct-current side unbalanced voltage Uo_dc is calculated by dividing a sum of a positive direct-current voltage and a negative direct-current voltage by 2, and then taking an effective value after band-pass filtering.

In a system for fault recovery of a voltage source converter, the locking module can lock each of the converter stations at the same time, and if the alternating-current side zero sequence voltage Uo_ac of a converter station is detected greater than or equal to the set value Uo_set2 for longer than the particular period of time Δt2 in the locking period, the fault determining and positioning module determines the converter station as a faulty station; otherwise, the fault determining and positioning module determines the converter station as a non-faulty station. The fault recovery module unlocks and recovers operation of the non-faulty stations after the faulty station is determined. Among the non-faulty stations, stations controlled by a direct-current voltage are unlocked to recover operation first, and then stations controlled by active power are unlocked to recover operation. The faulty station can be unlocked to recover operation after the alternating-current side zero sequence voltage Uo_ac of the faulty station is detected no greater than the set value Uo_set3 for longer than the particular period of time Δt3, or the faulty station can be unlocked to recover operation after being put into control of the zero sequence voltage.

In a system for fault recovery of a voltage source converter, the locking module locks converter stations controlled by active power, and for each converter station controlled by the active power, if the alternating-current side zero sequence voltage Uo_ac of the converter station is detected greater than the set value Uo_set2 for longer than the particular period of time Δt2 during the locking period, the fault determining and positioning module determines the converter station controlled by the active power as a faulty station; otherwise, the fault determining and positioning module determines the converter station controlled by the active power as a non-faulty station. The fault recovery module unlocks and recovers operation of other non-faulty stations controlled by the active power after the faulty station is determined. The faulty converter station controlled by the active power can be unlocked to recover operation after the alternating-current side zero sequence voltage Uo_ac is detected no greater than the set value Uo_set3 for longer than the particular period of time Δt3, or the faulty converter station controlled by the active power can be directly unlocked to recover operation after being put into control of the zero sequence voltage.

Further, in a system for fault recovery of a voltage source converter, the locking module locks stations controlled by the active power, and if that the alternating-current side zero sequence voltage Uo_ac of a station controlled by a direct-current voltage is detected greater than the set value Uo_set2 for longer than the particular period of time Δt2 during the locking period of the stations controlled by the active power, the fault determining and positioning module determines that the fault occurs in the station controlled by the direct-current voltage. After the station controlled by the direct-current voltage is monitored to be faulty, the converter stations controlled by the direct-current voltage need to be further locked, and if the alternating-current side zero sequence voltage Uo_ac of a converter station controlled by the direct-current voltage is detected greater than the set value Uo_set2 for longer than the particular period of time Δt2, the fault determining and positioning module determines the converter station controlled by the direct-current voltage as a faulty station; otherwise, the fault determining and positioning module determines the converter station controlled by the direct-current voltage as a non-faulty station. If there is any non-faulty station controlled by the direct-current voltage except the faulty station controlled by the direct-current voltage, the fault recovery module unlocks and recovers operation of the non-faulty station controlled by the direct-current voltage, and then unlocks and recovers operation of the stations controlled by the active power. The faulty station controlled by the direct-current voltage can be unlocked to recover operation after the alternating-current side zero sequence voltage Uo_ac of the faulty station is detected no greater than the set value Uo_set3 for longer than the particular period of time Δt3, or can be directly unlocked to recover operation after being put into control of the zero sequence voltage. If there is no non-faulty station controlled by the direct-current voltage except the faulty station controlled by the direct-current voltage, the fault recovery module can directly unlock and recover operation of the faulty station controlled by the direct-current voltage after the faulty station is controlled by the zero sequence voltage, and then unlock and recover operation of the stations controlled by the active power. Alternatively, the fault recovery module can convert a station controlled by the active power into a station controlled by the direct-current voltage to first unlock and recover operation of the station, and then unlock and recover operation of other stations controlled by the active power. The faulty station controlled by the direct-current voltage is unlocked to recover operation after the alternating-current side zero sequence voltage Uo_ac of the faulty station is detected no greater than the set value Uo_set3 for longer than the particular period of time Δt3.

In a system for fault recovery of a voltage source converter, a zero sequence voltage reference value Uoref generated through detection and control of the zero sequence voltage is superposed to a voltage reference wave Uref to generate a new voltage reference wave Uref_new for controlling the zero sequence voltage, where the voltage reference wave Uref is based on positive and negative sequence control and is generated through outer loop power control and inner loop current control. A method for calculating the zero sequence voltage Uo_ac according to an alternating-current voltage is to divide a sum of alternating-current voltages of three phases by 3, and a method for calculating the zero sequence voltage Uo_dc according to a direct-current voltage is to divide a sum of a positive voltage and a negative voltage by 2, and a selector selects Uo_ac or Uo_ac as Uoref. A control block diagram in detail is shown in FIG. 4.

In a system for fault recovery of a voltage source converter, according to characteristics of the fault, value ranges of the fault set values are as follows: a value range of Uo_set1 is 0.01 times a rated alternating-current voltage to 0.8 times the rated alternating-current voltage, and a value range of Δt1 is 0 s to 6000 s; a value range of Uo_set2 is 0.01 times the rated alternating-current voltage to 0.8 times the rated alternating-current voltage, and a value range of Δt2 is 0 s to 6000 s; a value range of Uo_set3 is 0.01 times the rated alternating-current voltage to 0.8 times the rated alternating-current voltage, and a value range of Δt3 is 0 s to 6000 s.

In the foregoing system for fault recovery of a voltage source converter, when the converter includes a full-bridge sub-module or a similar full-bridge sub-module topological structure, the full-bridge sub-module, the similar full-bridge sub-module and a clamp double sub-module lock the converter in a full-locking manner or a half-locking manner. On/off states of the similar full-bridge and full-bridge half-locking sub-modules are as shown in Table 2 and Table 3. On/off states of the clamp double sub-module are as shown in Table 4. When the voltage source converter is a half-bridge sub-module topological structure, the converter stations are locked in a locking manner. On/off states of the half-bridge topological structure locking sub-module are as shown in Table 1.

In actual application, with reference to the method for fault positioning, it is also feasible to lock and detect the converter stations sequentially as required, to implement detection and positioning of an alternating-current fault. After the fault is positioned, during fault recovery, operation can also be recovered by superposing a zero sequence voltage to control the non-faulty station or superposing a zero sequence voltage to control both the faulty station and the non-faulty station, which both disclosed in the method studied in the present solution.

It should be noted that this implementation solution is described by using two terminals flexible direct-current transmission as an example. The present invention is also adapted for a flexible alternating-current and direct-current transmission system consisting of two or more voltage source type converter stations, for example, two-terminal/multi-terminal flexible direct-current transmission, a direct-current power distribution grid, and a unified power flow controller (UPFC), and so on. Meanwhile, the implementation solution is illustrated by using a full-bridge sub-module, a similar full-bridge sub-module, a clamp double sub-module and a half-bridge sub-module as examples, but this solution is also applicable to any two-terminal and multi-terminal systems consisting of voltage source converters, such as a multiplex converter topology and an X-MMC sub-module topological structure.

The foregoing methods are merely used for illustrating the technical idea of the present invention, but cannot limit the protection scope of the present invention. Any change made based on the technical solution according to the technical idea proposed in the present invention falls in the protection scope of the present invention.

What is claimed is:

1. A method for fault positioning of a voltage source converter, the method comprising locking the converter when an alternating-current side zero sequence voltage Uo_ac or a direct-current side unbalanced voltage Uo_dc of a voltage source type converter station is detected greater than a set first threshold Uo_set1 for longer than a set period of time Δt1; and during the locking period, determining a converter station as a faulty station when the alternating-current side zero sequence voltage Uo_ac of the converter station is detected greater than a set second threshold Uo_set2 for longer than a set period of time Δt2; otherwise, determining the converter station as a non-faulty station.

2. The method for fault positioning of a voltage source converter according to claim 1, wherein the alternating-current side zero sequence voltage Uo_ac is calculated by dividing a sum of alternating-current voltages of three phases by 3, and then taking an effective value after band-pass filtering; and the direct-current side unbalanced voltage Uo_dc is calculated by dividing a sum of a positive direct-current voltage and a negative direct-current voltage by 2, and then taking an effective value after band-pass filtering.

3. The method for fault positioning of a voltage source converter according to claim 1, wherein in a step of locking the converter, each converter station can be locked at the same time, or converter stations controlled by active power can be locked first and converter stations controlled by a direct-current voltage are then locked after it is detected to be faulty.

4. The method for fault positioning of a voltage source converter according to claim 3, wherein in the step of locking the converter, when locking each converter stations at the same time, if the alternating-current side zero sequence voltage Uo_ac of a converter station stays greater than or equal to the set second threshold Uo_set2 for longer than the set period of time Δt2 during the locking period, the converter station is determined as a faulty station; otherwise, the converter station is determined as a non-faulty station.

5. The method for fault positioning of a voltage source converter according to claim 3, wherein in a step of first locking the converter stations controlled by the active power, during the locking period, if the alternating-current side zero sequence voltage Uo_ac of a converter station controlled by the active power stays greater than the set second threshold Uo_set2 for longer than the set period of time Δt2, the converter station controlled by the active power is determined as a faulty station; otherwise, the converter station controlled by the active power is determined as a non-faulty station.

6. The method for fault positioning of a voltage source converter according to claim 3, wherein first locking the converter stations controlled by the active power, and if the alternating-current side zero sequence voltage Uo_ac of a station controlled by the direct-current voltage stays greater than the set first threshold Uo_set1 for longer than the set period of time Δt1 during the locking period of the converter stations controlled by the active power, it is determined that the station controlled by the direct-current voltage is faulty; the converter stations controlled by the direct-current voltage need to be further locked, when the alternating-current side zero sequence voltage Uo_ac of a converter station controlled by the direct-current voltage is detected greater than the set second threshold Uo_set2 for longer than the set period of time Δt2, the converter station controlled by the direct-current voltage is determined as a faulty station; otherwise, the converter station controlled by the direct-current voltage is determined as a non-faulty station.

7. The method for fault positioning of a voltage source converter according to claim 1, wherein a value range of Uo_set1 is 0.01 times a rated alternating-current voltage to 0.8 times the rated alternating-current voltage, and a value range of Δt1 is 0 s to 6000 s.

8. The method for fault positioning of a voltage source converter according to claim 1, wherein a value range of Uo_set2 is 0.01 times a rated alternating-current voltage to 0.8 times the rated alternating-current voltage, and a value range of Δt2 is 0 s to 6000 s.

9. The method for fault positioning of a voltage source converter according to claim 1, wherein when the converter comprises a full-bridge sub-module, a similar full-bridge sub-module or a clamp double sub-module topological structure, the converter is locked in a full-locking manner or a half-locking manner.

10. The method for fault positioning of a voltage source converter according to claim 1, wherein when the converter is a half-bridge sub-module topological structure, converter stations are locked in a locking manner.

11. A system for fault positioning of a voltage source converter, the system comprising a detection module, a locking module and a fault determining and positioning module,
wherein, the locking module locks the converter when the detection module detects that an alternating-current side zero sequence voltage Uo_ac or a direct-current side unbalanced voltage Uo_dc of a converter station stays greater than a set first threshold Uo_set1 for longer than a set period of time Δt1; and when the alternating-current side zero sequence voltage Uo_ac of a converter station is detected greater than a set second threshold Uo_set2 for longer than a set period of time Δt2 during the locking period, the fault determining and positioning module determines the converter station as a faulty station; otherwise, the fault determining and positioning module determines the converter station as a non-faulty station.

12. The system for fault positioning of a voltage source converter according to claim 11, wherein in the detection module, the alternating-current side zero sequence voltage Uo_ac is calculated by dividing a sum of alternating-current voltages of three phases by 3, and then taking an effective value after band-pass filtering; and the direct-current side unbalanced voltage Uo_dc is calculated by dividing the sum of a positive direct-current voltage and a negative direct-current voltage by 2, and then taking an effective value after band-pass filtering.

13. The system for fault positioning of a voltage source converter according to claim 11, wherein in the process of locking the converter, the locking module can lock each converter station at the same time, or first lock converter stations controlled by active power and then lock converter stations controlled by a direct-current voltage.

14. The system for fault positioning of a voltage source converter according to claim 13, wherein each converter station are locked at the same time, if the alternating-current side zero sequence voltage Uo_ac of a converter station stays greater than or equal to the set second threshold Uo_set2 for longer than the set period of time Δt2 during the locking period, the converter station is determined as a faulty station; otherwise, the converter station is determined as a non-faulty station.

15. The system for fault positioning of a voltage source converter according to claim 13, wherein when the locking module locks the converter stations controlled by the active power, during the locking period, if the alternating-current side zero sequence voltage Uo_ac of a converter station controlled by the active power is detected greater than the set second threshold Uo_set2 for longer than the set period of time Δt2, the fault determining and positioning module determines the converter station controlled by the active power as a faulty station; otherwise, the fault determining and positioning module determines the converter station controlled by the active power as a non-faulty station.

16. The system for fault positioning of a voltage source converter according to claim 14, wherein the locking module locks the converter stations controlled by the active power, if the alternating-current side zero sequence voltage Uo_ac of a station controlled by the direct-current voltage is detected greater than the set first threshold Uo_set1 for longer than the particular period of time Δt1 during the locking period of the converter stations controlled by the active power, the fault-determining positioning module determines that the station controlled by the direct-current voltage is faulty; the locking module needs to further lock the converter stations controlled by the direct-current voltage, and if the alternating-current side zero sequence voltage Uo_ac of a converter station controlled by the direct-current voltage is detected greater than the set second threshold Uo_set2 for longer than the set period of time Δt2, the converter station controlled by the direct-current voltage is determined as a faulty station; otherwise, the converter station controlled by the direct-current voltage is determined as a non-faulty station.

17. The system for fault positioning of a voltage source converter according to claim 11, wherein a value range of Uo_set1 is 0.01 times a rated alternating-current voltage to 0.8 times the rated alternating-current voltage, and a value range of Δt1 is 0 s to 6000 s.

18. The system for fault positioning of a voltage source converter according to claim 11, characterized in that: a value range of Uo_set2 is 0.01 times a rated alternating-current voltage to 0.8 times the rated alternating-current voltage, and a value range of Δt2 is 0 s to 6000 s.

19. The system for fault positioning of a voltage source converter according to claim 11, wherein when the converter comprises a full-bridge sub-module, a similar full-bridge sub-module or a clamp double sub-module topological structure, the converter is locked in a full-locking manner or half-locking manner.

20. The system for fault positioning of a voltage source converter according to claim 11, wherein when the converter is a half-bridge sub-module topological structure, converter stations are locked in a locking manner.

21. A method for fault recovery of a voltage source converter, the method comprising locking the converter when an alternating-current side zero sequence voltage Uo_ac or a direct-current side unbalanced voltage Uo_dc of a voltage source converter station is detected greater than a set first threshold Uo_set1 for longer than a set period of time Δt1; during the locking period, for each converter station, determining the converter station as a faulty station when the alternating-current side zero sequence voltage Uo_ac of the converter station is detected greater than a set second threshold Uo_set2 for longer than a set period of time Δt2; otherwise, determining the converter station as a non-faulty station; and
unlocking and recovering operation of non-faulty station after the faulty station is positioned, the faulty station can be directly unlocked to recover operation after being put into control of a zero sequence voltage, or the faulty station can be unlocked to recover operation after the alternating-current side zero sequence voltage Uo_ac stays less than or equal to a set third threshold Uo_set3 for longer than a set period of time Δt3.

22. The method for fault recovery of a voltage source converter according to claim 21, wherein the alternating-current side zero sequence voltage Uo_ac is calculated by dividing a sum of alternating-current voltages of three phases by 3, and then taking an effective value after band-pass filtering; and the direct-current side unbalanced voltage Uo_ac is calculated by dividing a sum of a positive direct-current voltage and a negative direct-current voltage by 2, and then taking an effective value after band-pass filtering.

23. The method for fault recovery of a voltage source converter according to claim 21, wherein each converter station is locked at the same time, and during the locking period, if the alternating-current side zero sequence voltage Uo_ac of a converter station stays greater than or equal to the set second threshold Uo_set2 for longer than the set period of time Δt2, the converter station is determined as a faulty station; otherwise, the converter station is determined as a non-faulty station; and the non-faulty stations are unlocked to recover operation after the faulty station is positioned; among the non-faulty stations, stations controlled by a direct-current voltage are first unlocked to recover operation, and stations controlled by active power are then unlocked to recover operation; and the faulty station is unlocked to recover operation after the alternating-current side zero sequence voltage Uo_ac of the faulty station is detected less than the set third threshold Uo_set3 for longer than the particular period of time Δt3.

24. The method for fault recovery of a voltage source converter according to claim 21, wherein each converter station is locked at the same time, and during the locking period, if the alternating-current side zero sequence voltage Uo_ac of a converter station stays greater than or equal to the set second threshold Uo_set2 for longer than the set period of time Δt2, the converter station is determined as a faulty station; otherwise, the converter station is determined as a non-faulty station; and the non-faulty stations are unlocked to recover operation after the faulty station is positioned; among the non-faulty stations, stations controlled by a direct-current voltage are first unlocked to recover operation, and stations controlled by active power are then unlocked to recover operation; and the faulty station is unlocked to recover operation after being put into control of the zero sequence voltage.

25. The method for fault recovery of a voltage source converter according to claim 21, wherein converter stations controlled by active power are locked, and during the locking period, for each converter station controlled by the active power, if the alternating-current side zero sequence voltage Uo_ac of the converter station stays greater than the second threshold Uo_set2 for longer than the set period of time Δt2, the converter station controlled by the active power is determined as a faulty station; otherwise, the converter station controlled by the active power is determined as a non-faulty station; and other non-faulty stations controlled by the active power are unlocked to recover operation, and the faulty converter station controlled by the active power can be unlocked to recover operation after the alternating-current side zero sequence voltage Uo_ac is detected no greater than the set third threshold Uo_set3 for longer than the set period of time Δt3, or the faulty converter station controlled by the active power can be directly unlocked to recover operation after being put into control of the zero sequence voltage.

26. The method for fault recovery of a voltage source converter according to claim 21, wherein stations controlled by the active power are locked, and during the locking period of the stations controlled by the active power, if the alternating-current side zero sequence voltage Uo_ac of a station controlled by a direct-current voltage stays greater than the set second threshold Uo_set1 for longer than the particular period of time Δt1, determining the station controlled by the direct-current voltage as a faulty station;

the converter stations controlled by the direct-current voltage are further locked, and if the alternating-current side zero sequence voltage Uo_ac of a converter station controlled by the direct-current voltage is detected greater than the set second threshold Uo_set2 for longer than the set period of time Δt2, the converter station controlled by the direct-current voltage is determined as a faulty station; otherwise, the converter station controlled by the direct-current voltage is determined as a non-faulty station;

if there is non-faulty station controlled by the direct-current voltage except the faulty station controlled by the direct-current voltage, the non-faulty station controlled by the direct-current voltage is unlocked to recover operation, and then the stations controlled by the active power are unlocked to recover operation; the faulty station controlled by the direct-current voltage can be unlocked to recover operation after the alternating-current side zero sequence voltage Uo_ac is detected no greater than the set third threshold Uo_set3 for longer than the set period of time Δt3, or can be directly unlocked to recover operation after being put into control of the zero sequence voltage; and if there is no non-faulty station controlled by the direct-current voltage except the faulty station controlled by the direct-current voltage, the faulty station controlled by the direct-current voltage can be directly unlocked to recover operation after being put into control of the zero sequence voltage, and then the stations controlled by the active power are unlocked to recover operation; alternatively, a station controlled by the active power can be first converted into a station controlled by the direct-current voltage and unlocked to recover operation, other stations controlled by the active power are then unlocked to recover operation, and the faulty station controlled by the direct-current voltage is unlocked to recover operation after it is detected that the alternating-current side zero sequence voltage Uo_ac stays no greater than the set third threshold Uo_set3 for longer than the set period of time Δt3.

27. The method for fault recovery of a voltage source converter according to claim 21, wherein a zero sequence voltage reference value Uoref generated through detection and control of the zero sequence voltage is superposed to an original voltage reference wave Uref to generate a new voltage reference wave Uref_new for performing control.

28. The method for fault recovery of a voltage source converter according to claim 21, wherein according to an alternating-current voltage, the zero sequence voltage Uo_rac is calculated by dividing a sum of alternating-current voltages of three phases by 3, according to a direct-current voltage, the zero sequence voltage Uo_rdc is calculated by dividing a sum of a positive voltage and a negative voltage by 2, and a selector selects Uo_rac or Uo_rdc as Uoref.

29. The method for fault recovery of a voltage source converter according to claim 21, wherein a value range of Uo_set1 is 0.01 times a rated alternating-current voltage to 0.8 times the rated alternating-current voltage, and a value range of Δt1 is 0 s to 6000 s.

30. The method for fault recovery of a voltage source converter according to claim 21, wherein a value range of Uo_set2 is 0.01 times a rated alternating-current voltage to 0.8 times the rated alternating-current voltage, and a value range of Δt2 is 0 s to 6000 s.

31. The method for fault recovery of a voltage source converter according to claim 21, wherein a value range of Uo_set3 is 0.01 times a rated alternating-current voltage to 0.8 times the rated alternating-current voltage, and a value range of Δt3 is 0 s to 6000 s.

32. The method for fault recovery of a voltage source converter according to claim 21, wherein when the converter comprises a full-bridge sub-module, a similar full-bridge sub-module or a clamp double sub-module topological structure, the converter is locked in a full-locking manner or a half-locking manner.

33. The method for fault recovery of a voltage source converter according to claim 21, wherein when the converter is a half-bridge sub-module topological structure, converter stations are locked in a locking manner.

34. A system for fault recovery of a voltage source converter, the system comprising a detection module, a locking module, a fault-determining positioning module, and a fault recovery module,
wherein, the locking module locks the converter when the detection module detects that an alternating-current side zero sequence voltage Uo_ac or a direct-current side unbalanced voltage Uo_dc of a voltage source converter station stays greater than a set first threshold Uo_set1 for longer than a set period of time $\Delta t1$; during the locking period, for each converter station, if the alternating-current side zero sequence voltage Uo_ac of a converter station is detected greater than a set second threshold Uo_set2 for longer than a set period of time $\Delta t2$, the fault determining and positioning module determines the converter station as a faulty station; otherwise, the fault determining and positioning module determines the converter station as a non-faulty station; and
the fault recovery module recovers and unlocks operation of non-faulty stations after the faulty station is positioned, the faulty station can be directly unlocked to recover operation after being put into control of a zero sequence voltage, or the faulty station can be unlocked to recover operation after the alternating-current side zero sequence voltage Uo_ac stays no greater than a set third threshold Uo_set3 for longer than a set period of time $\Delta t3$.

35. The system for fault recovery of a voltage source converter according to claim 34, wherein in the detection module, the alternating-current side zero sequence voltage Uo_ac is calculated by dividing a sum of alternating-current voltages of three phases by 3, and then taking an effective value after band-pass filtering; and the direct-current side unbalanced voltage Uo_dc is calculated by using the following method: dividing a sum of a positive direct-current voltage and a negative direct-current voltage by 2, and then taking an effective value after band-pass filtering.

36. The system for fault recovery of a voltage source converter according to claim 34, wherein the locking module locks each converter station at the same time, and during the locking period, if it is detected that the alternating-current side zero sequence voltage Uo_ac of a converter station stays greater than or equal to the set second threshold Uo_set2 for longer than the set period of time $\Delta t2$, the fault determining and positioning module determines the converter station as a faulty station; otherwise, the fault determining and positioning module determines the converter station as a non-faulty station; and
the fault recovery module unlocks and recovers operation of the non-faulty stations after the faulty station is positioned; among the non-faulty stations, stations controlled by a direct-current voltage are first unlocked to recover operation, and stations controlled by active power are then unlocked to recover operation; and the faulty station is unlocked to recover operation after the alternating-current side zero sequence voltage Uo_ac of the faulty station is detected no greater than the set third threshold Uo_set3 for longer than the set period of time $\Delta t3$.

37. The system for fault recovery of a voltage source converter according to claim 34, wherein the locking module locks each converter stations at the same time, and during the locking period, if the alternating-current side zero sequence voltage Uo_ac of a converter station is detected greater than or equal to the set second threshold Uo_set2 for longer than the set period of time $\Delta t2$, the fault determining and positioning module determines the converter station as a faulty station; otherwise, the fault determining and positioning module determines the converter station as a non-faulty station; and
the fault recovery module unlocks and recovers operation of the non-faulty stations after the faulty station is positioned; among the non-faulty stations, stations controlled by a direct-current voltage are first unlocked to recover operation and stations controlled by active power are then unlocked to recover operation; and the faulty station is unlocked to recover operation after being put into control of the zero sequence voltage.

38. The system for fault recovery of a voltage source converter according to claim 34, wherein the locking module locks converter stations controlled by active power, and during the locking period, for each converter station controlled by the active power, if the alternating-current side zero sequence voltage Uo_ac is detected greater than the second threshold Uo_set2 for longer than the set period of time $\Delta t2$, the fault determining and positioning module determines the converter station controlled by the active power as a faulty station; otherwise, the fault determining and positioning module determines the converter station controlled by the active power as a non-faulty station; and
the fault recovery module unlocks and recovers operation of other non-faulty stations controlled by the active power after the faulty station is positioned, the faulty converter station controlled by the active power can be unlocked to recover operation after the alternating-current side zero sequence voltage Uo_ac is detected no greater than the set third threshold Uo_set3 for longer than the set period of time $\Delta t3$, or the faulty converter station controlled by the active power can be directly unlocked to recover operation after being put into control of the zero sequence voltage.

39. The system for fault recovery of a voltage source converter according to claim 34, wherein the locking module locks stations controlled by the active power, and in the locking period of the stations controlled by the active power, if the alternating-current side zero sequence voltage Uo_ac of a station controlled by a direct-current voltage is detected greater than the set second threshold Uo_set1 for longer than the set period of time $\Delta t1$, the fault determining and positioning module determines that the fault occurs in the station controlled by the direct-current voltage; after the station controlled by the direct-current voltage is monitored to be faulty, the converter stations controlled by the direct-current voltage need to be further locked, and if the alternating-current side zero sequence voltage Uo_ac of a converter station controlled by the direct-current voltage is detected greater than the set second threshold Uo_set2 for longer than the set period of time $\Delta t2$, the fault determining and positioning module determines the converter station controlled by the direct-current voltage as a faulty station; otherwise, the fault determining and positioning module determines the converter station controlled by the direct-current voltage as a non-faulty station;

if there is non-faulty station controlled by the direct-current voltage except the faulty station controlled by the direct-current voltage, the fault recovery module unlocks and recovers operation of the non-faulty station controlled by the direct-current voltage, and then unlocks and recovers operation of the stations controlled by the active power; the faulty station controlled by the direct-current voltage can be unlocked to recover operation after the alternating-current side zero sequence voltage Uo_ac is detected no greater than a set third threshold Uo_set3 for longer than the set period of time Δt3, or can be directly unlocked to recover operation after being put into control of the zero sequence voltage; and if there is no non-faulty station controlled by the direct-current voltage except the faulty station controlled by the direct-current voltage, the fault recovery module can directly unlock and recover operation of the faulty station controlled by the direct-current voltage after the faulty station is controlled by the zero sequence voltage, and then unlock and recover operation of the stations controlled by the active power; alternatively, the fault recovery module can convert a station controlled by the active power into a station controlled by the direct-current voltage to first unlock and recover operation of the station, and then unlock and recover operation of other stations controlled by the active power, and the faulty station controlled by the direct-current voltage is unlocked to recover operation after the alternating-current side zero sequence voltage Uo_ac is detected no greater than or less than or equal to the set third threshold Uo_set3 for longer than the set period of time Δt3.

40. The system for fault recovery of a voltage source converter according to claim 34, wherein a zero sequence voltage reference value Uoref generated through detection and control of the zero sequence voltage is superposed to an original voltage reference wave Uref to generate a new voltage reference wave Uref_new for performing control.

41. The system for fault recovery of a voltage source converter according to claim 34, wherein according to an alternating-current voltage, the zero sequence voltage Uo_rac is calculated by dividing a sum of alternating-current voltages of three phases by 3, and according to a direct-current voltage, the zero sequence voltage Uo_rdc is calculated by dividing a sum of a positive voltage and a negative voltage by 2, and a selector selects Uo_rac or Uo_rdc as Uoref.

42. The system for fault recovery of a voltage source converter according to claim 34, wherein a value range of Uo_set1 is 0.01 times a rated alternating-current voltage to 0.8 times the rated alternating-current voltage, and a value range of Δt1 is 0 s to 6000 s.

43. The system for fault recovery of a voltage source converter according to claim 34, wherein a value range of Uo_set2 is 0.01 times a rated alternating-current voltage to 0.8 times the rated alternating-current voltage, and a value range of Δt2 is 0 s to 6000 s.

44. The system for fault recovery of a voltage source converter according to claim 34, wherein a value range of Uo_set3 is 0.01 times a rated alternating-current voltage to 0.8 times the rated alternating-current voltage, and a value range of Δt3 is 0 s to 6000 s.

45. The system for fault recovery of a voltage source converter according to claim 34, wherein when the converter comprises a full-bridge sub-module, a similar full-bridge sub-module or a clamp double sub-module topological structure, the converter is locked in a full-locking manner or a half-locking manner.

46. The system for fault recovery of a voltage source converter according to claim 34, wherein when the converter is a half-bridge sub-module topological structure, converter stations are locked in a locking manner.

* * * * *